US011409263B2

(12) United States Patent
Zhang et al.

(10) Patent No.: US 11,409,263 B2
(45) Date of Patent: Aug. 9, 2022

(54) METHOD FOR PROGRAMMING REPEATING MOTION OF REDUNDANT ROBOTIC ARM

(71) Applicant: South China University of Technology, Guangzhou (CN)

(72) Inventors: Zhijun Zhang, Guangzhou (CN); Ziyi Yan, Guangzhou (CN)

(73) Assignee: South China University of Technology, Guangzhou (CN)

( * ) Notice: Subject to any disclaimer, the term of this patent is extended or adjusted under 35 U.S.C. 154(b) by 354 days.

(21) Appl. No.: 16/497,924

(22) PCT Filed: Nov. 15, 2017

(86) PCT No.: PCT/CN2017/111107
§ 371 (c)(1),
(2) Date: Sep. 26, 2019

(87) PCT Pub. No.: WO2018/176854
PCT Pub. Date: Oct. 4, 2018

(65) Prior Publication Data
US 2021/0011458 A1    Jan. 14, 2021

(30) Foreign Application Priority Data

Mar. 27, 2017    (CN) .......................... 201710188430.4

(51) Int. Cl.
G05B 19/4155    (2006.01)
B25J 9/16    (2006.01)
(Continued)

(52) U.S. Cl.
CPC .......... *G05B 19/4155* (2013.01); *B25J 9/163* (2013.01); *B25J 9/1607* (2013.01); *B25J 9/1664* (2013.01);
(Continued)

(58) Field of Classification Search
CPC ...... B25J 9/1607; B25J 9/1643; B25J 9/1664; B25J 9/163; B25J 9/1656; B25J 9/1658;
(Continued)

(56) References Cited

U.S. PATENT DOCUMENTS

2010/0228396 A1\* 9/2010 Pechev .................. B25J 9/1607
700/263
2014/0188273 A1\* 7/2014 Khoukhi ................ B25J 9/1664
700/250

FOREIGN PATENT DOCUMENTS

CN    101804627 A    8/2010
CN    101927495 A    12/2010
(Continued)

OTHER PUBLICATIONS

Cai et al., "Different-Level Redundancy-Resolution and Its Equivalent Relationship Analysis for Robot Manipulators Using Gradient-Descent and Zhang et al.'s Neural-Dynamic Methods", Jan. 13, 2011, IEEE, IEEE Transactions on Industrial Electronics: vol. 59, Issue 8, pp. 3146-3155 (Year: 2011).\*
(Continued)

*Primary Examiner* — Khoi H Tran
*Assistant Examiner* — Tanner L Cullen
(74) *Attorney, Agent, or Firm* — Fishman Stewart PLLC

(57) ABSTRACT

A method is presented for programming a repeating motion of a redundant robotic arm on the basis of a variable parameter convergence differential neural network. The method may include establishing an inverse kinematics equation, creating an inverse kinematics problem, introducing a repeating motion indicator, converting a time-varying convex quadratic programming problem into a time-varying matrix equation, and integrating an optimal solution to obtain an optimal solution of a joint angle. The use of the variable parameter convergence differential neural network to solve the repeating redundant mechanical motion has the
(Continued)

advantages of high computational efficiency, high real-time performance, and enhanced robot arm robustness.

4 Claims, 2 Drawing Sheets

(51) Int. Cl.
*G06F 17/16* (2006.01)
*G06N 3/063* (2006.01)
(52) U.S. Cl.
CPC .............. *G06F 17/16* (2013.01); *G06N 3/063* (2013.01); *G05B 2219/40392* (2013.01)
(58) Field of Classification Search
CPC ................ B25J 9/161; G05B 19/4155; G05B 2219/40392; G05B 2219/39415; G05B 2219/39271; G06N 3/063; G06N 5/003; G06N 3/049; G06F 17/16
See application file for complete search history.

(56) References Cited

FOREIGN PATENT DOCUMENTS

| CN | 102672719 | A | | 9/2012 | |
| CN | 101927495 | B * | | 4/2013 | ............... B25J 13/00 |
| CN | 105538327 | A | | 5/2016 | |
| CN | 105956297 | A | | 9/2016 | |
| CN | 106055522 | A | | 10/2016 | |
| CN | 106426164 | A | | 2/2017 | |
| CN | 106945041 | A | | 7/2017 | |
| DE | 4333820 | A1 | | 4/1994 | |
| JP | 2007136590 | A | | 6/2007 | |
| WO | WO-9317375 | A1 | | 9/1993 | |
| WO | WO-2017129200 | A1 * | | 8/2017 | ............ B25J 9/1648 |

OTHER PUBLICATIONS

Zhang et al., "Repetitive Motion Planning of Kinematically Redundant Manipulators Using LVI-based Primal-Dual Neural Network", Sep. 24, 2007, IEEE, 2007 International Conference on Mechatronics and Automation, pp. 3138-3143 (Year: 2007).*
Zhang et al., "Neural-Dynamic-Method-Based Dual-Arm CMG Scheme With Time-Varying Constraints Applied to Humanoid Robots ", Aug. 31, 2015, IEEE, IEEE Transactions on Neural Networks and Learning Systems: vol. 26, Issue 12, pp. 3251-3262 (Year: 2015).*
Zhang et al., "Self-Motion Planning of Redundant Robot Manipulators Based on Quadratic Program and Shown via PA10 Example", Feb. 6, 2009, IEEE, 2008 2nd International Symposium on Systems and Control in Aerospace and Astronautics (Year: 2009).*
International Search Report PCT/CN2017/111107 dated Feb. 14, 2018.

* cited by examiner

METHOD FOR PROGRAMMING REPEATING MOTION OF REDUNDANT ROBOTIC ARM

CROSS-REFERENCE TO RELATED APPLICATIONS

This application claims priority to China Patent Application No. CN 201710188430.4 filed Mar. 27, 2017, and International Patent Application No. PCT/CN2017/111107 filed Nov. 15, 2017, both of which are hereby incorporated by reference in their entirety.

FIELD OF THE DISCLOSURE

The present disclosure relates to the field of redundant robotic arms, and in particular to a method for programming and operating a repeating motion of a redundant robotic arm on the basis of a variable parameter convergence differential neural network.

BACKGROUND OF THE DISCLOSURE

The term "redundant robotic arm" means that the number of degrees of freedom of the robotic arm is greater than the number of degrees of freedom required to complete a task, so that when completing the main tasks by an end effector, the redundant robotic arm can also perform additional tasks such as avoiding an obstacle avoidance, a shutdown extreme position, and a singular state of the robotic arm due to the more degrees of freedom. The term "repeating motion" means that after the end of the robotic arm completes a cycle of actions, all the joints thereof can return to the initial positions, not just the end of the robotic arm returns back to the initial position. In the automated industrial production, the robotic arm usually needs to carry out mass production activities, if the robotic arm completes a non-repeating motion, that is, the initial state of each cycle of motions is different, an error will occur, and after the error has been accumulated to a certain extent, additional reset operation of the robotic arm is required, and the production efficiency will be greatly reduced. Therefore, it is meaningful to study the repeating motion of the redundant robotic arm.

The traditional solution to the inverse kinematics problem of the redundant robotic arm is based on a pseudo-inverse method, this method is computationally intensive, has poor real-time performance, and considers a single problem constraint, which is greatly restricted in the actual application of the robotic arm. A quadratic programming scheme has been proposed to solve the repeating motion of a redundant robotic arm, which is divided into a numerical method solver and a neural network solver. Compared with the numerical method solver, the neural network solver has the advantages of being more efficient and having better real-time performance.

OVERVIEW OF THE DISCLOSURE

In view of the deficiencies of the prior methodologies, an object of the present disclosure is to provide a method for programming a repeating motion of a redundant robotic arm on the basis of a variable parameter convergence differential neural network, which has a higher calculation accuracy and a better robustness compared with the classical recurrent neural network solver to solve the repeating motion problem of a redundant robotic arm.

While other objects of this disclosure are contemplated, for example purposes only, an object of the present disclosure may be achieved by means of the following exemplary technical solution:

A method for programming a repeating motion of a redundant robotic arm on the basis of a variable parameter convergence differential neural network, the method including the steps of:

1) establishing an inverse kinematics equation of the redundant robotic arm at a velocity level by means of a track of an end of the redundant robotic arm;

2) designing an inverse kinematics problem in step 1 as a time-varying convex quadratic programming problem constrained by an equality;

3) introducing a repeating motion indicator into the time-varying convex quadratic programming problem of step 2;

4) converting the time-varying convex quadratic programming problem, into which the repeating motion indicator is introduced in step 3, into a time-varying matrix equation by using a Lagrangian function;

5) solving the time-varying matrix equation of step 4 by means of the variable parameter convergence differential neural network; and 6) integrating an optimal solution, obtained in step 5, of the redundant robotic arm at the velocity level to obtain an optimal solution of a joint angle.

Further, in step 1, the inverse kinematics equation of the redundant robotic arm may be expressed as:

$$f(\theta)=r$$

where r is a desired track of the end of the redundant robotic arm, and $f(\bullet)$ is a nonlinear equation of the joint angle of the redundant robotic arm, and the inverse kinematics equation of the redundant robotic arm at the velocity level is obtained by deriving the two sides of the equation with respect to time:

$$J(\theta)\dot{\theta}=\dot{r}$$

where $J(\theta) \in R^{m \times n}$ is an m×n-dimensional matrix on the real number field, $J(\theta)$ is a Jacobian matrix of the redundant robotic arm, n is the number of the degrees of freedom of the robotic arm, and m is the number of the spatial dimensions of the track of the end of the robotic arm, and $\dot{\theta}$ and $\dot{r}$ are respectively the derivatives of the joint angle and the track of the end of the redundant robotic arm with respect to time.

Further, in step 2, the specific formula for designing the inverse kinematics problem in step 1 as a time-varying convex quadratic programming problem constrained by an equality may be:

$$\min\left(\frac{x^T W x}{2} + c^T x\right)$$
$$\text{s.t. } (J(\theta)x = b)$$

where $x=\dot{\theta}$, $b=\dot{r}$. $W=I$ represents an identity matrix, $J(\theta)$ is the Jacobian matrix of the redundant robotic arm, and c is a performance indicator coefficient.

Further, the repeating motion indicator in step 3 is obtainable by means of the performance indicator coefficient c, which is designed as $c=\zeta(\theta(t)-\theta(0))$, where $\zeta$ represents the response coefficient to a joint offset, and $\theta(t)$ and $\theta(0)$ respectively represent a joint state during the movement of the robotic arm and an initial joint state.

Further, in step 4, the Lagrangian function may be constructed as:

$$L(x, \lambda, t) = \frac{x^T W x}{2} + c^T x + \lambda(J(\theta)x - b)$$

where $\lambda$ is a Lagrangian multiplier, and the partial derivatives of the Lagrangian function respectively with respect to $x$ and $\lambda$ are obtained:

$$\frac{\partial L(x, \lambda, t)}{\partial x} = Wx + c + J^T(\theta)\lambda = 0$$

$$\frac{\partial L(x, \lambda, t)}{\partial \lambda} = J(\theta)x - b = 0$$

the above system of equations can be expressed as the following time-varying matrix equation:

$$Qy = u$$

where $Q = \begin{bmatrix} W & J^T(\theta) \\ J(\theta) & 0 \end{bmatrix} \in E^{(n+m)\times(n+m)}$, $$y = \begin{bmatrix} x \\ \lambda \end{bmatrix} \in R^{(n+m)}, u = \begin{bmatrix} -c \\ b \end{bmatrix} \in R^{(n+m)}$$

Further, the specific process of step 5 may be that the error of the time-varying matrix equation converges to zero based on the variable parameter convergence differential neural network, firstly, an error function is constructed as:

$$\varepsilon(t) = Qy - u$$

where $\varepsilon(t)$ represents the error of the time-varying matrix equation, and then based on a neurodynamic method, the error may be designed to converge to zero in the following way, the specific formula is:

$$\frac{d\varepsilon(t)}{dt} = -\gamma \exp(t)\Phi(\varepsilon(t))$$

where $\gamma$ may be a parameter for adjusting a convergence rate, $\Phi(\cdot)$ is an activation function, and the error function is substituted into the above formula to obtain a variable parameter convergence differential neural network solver, namely:

$$Q\dot{y} = -\dot{Q}y - \gamma \exp(t)\Phi(Qy - u) + \dot{u}$$

In this way, the variable parameter convergence differential neural network solver obtains an optimal solution y* of the time-varying matrix equation, and the first n terms thereof are the optimal solution x* of the time-varying convex quadratic programming problem in step 2 i.e., the optimal solution of a joint angular velocity.

Further, the optimal solution θ* of the joint angle in step 6 is obtained by integrating the optimal solution of the time-varying convex quadratic programming problem, i.e. the optimal solution x* of the joint angular velocity.

As compared with prior systems, the present disclosure has the following advantages and beneficial effects:

The present disclosure may solve the problem of non-repeating motion of the redundant robotic arm by means of the quadratic programming scheme, which can consider various constraint conditions, and has a good real-time performance as compared with the traditional pseudo-inverse based method.

The present disclosure may use a neural network solver, and the calculation speed is faster and the efficiency is higher as compared with the numerical method solver.

The present disclosure may use a novel variable parameter convergence differential neural network solver, which has a faster convergence speed, a higher calculation precision and a better robustness as compared with the classical recurrent neural network solver.

DETAILED DESCRIPTION OF THE EMBODIMENTS

The present disclosure will be further described in detail below in connection with embodiments and the accompanying drawings, but embodiments of the present disclosure are not limited thereto.

Figure 1:
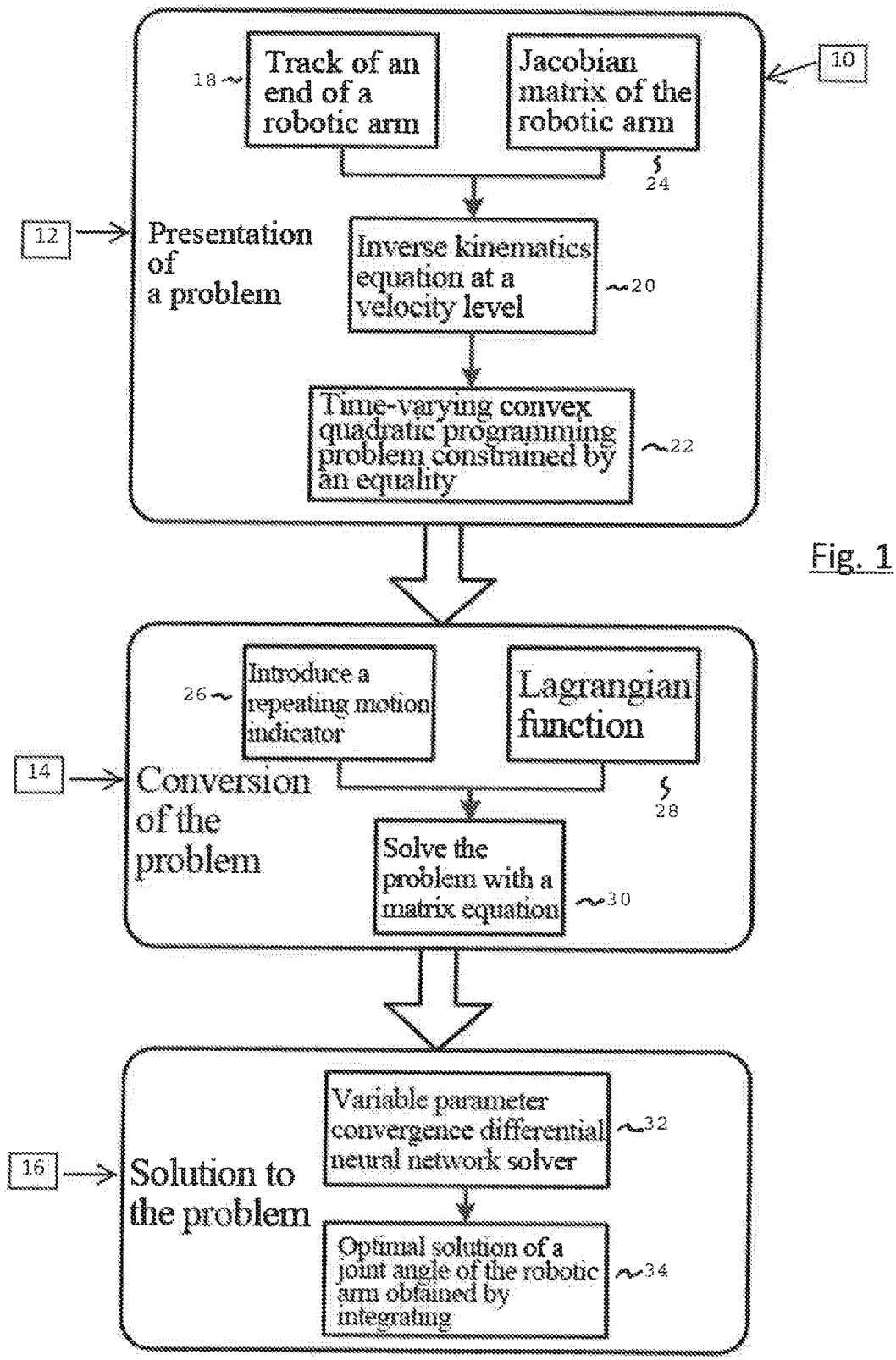
FIG. 1 is a flowchart of a method for programming a repeating motion of a redundant robotic arm of an embodiment of the present disclosure.

An exemplary embodiment provides a method for programming a repeating motion of a redundant robotic arm 10 on the basis of a variable parameter convergence differential neural network, the flow chart thereof is shown in FIG. 1, and is composed of three parts: presentation of a problem 12, conversion of the problem 14 and creating a solution to the problem 16. Firstly, the inverse kinematics equation at a velocity level is established according to the desired track of an end of the redundant robotic arm and the Jacobian matrix. The repeating motion of the redundant robotic arm is designed as a time-varying convex quadratic programming problem constrained by an equality. The quadratic programming problem is converted into a matrix equation problem by means of a Lagrangian function. And finally, the matrix equation is solved by means of the variable parameter convergence differential neural network. The following steps are contemplated. It will be appreciated that more or fewer steps could be deployed:

1) establishing an inverse kinematics equation 20 of the redundant robotic arm 10 at a velocity level by means of a track 18 of an end of the redundant robotic arm. In this step, the inverse kinematics equation 20 of the redundant robotic arm is expressed as:

$$f(\theta) = r$$

where r is a desired track of the end of the redundant robotic arm, and $f(\cdot)$ is a nonlinear equation of the joint angle of the redundant robotic arm, which is determined by the structure of the robotic arm 10, a Kinova Jaco six-axis robotic arm is simulated in this embodiment, and the inverse kinematics equation 20 of the redundant robotic arm at the velocity level is obtained by deriving the two sides of the equation with respect to time:

$$J(\theta)\dot{\theta} = \dot{r}$$

Here, $J(\theta) \in R^{m \times n}$ is an m×n-dimensional matrix on the real number field, $J(\theta)$ is a Jacobian matrix of the redundant robotic arm, n is the number of the degrees of freedom of the robotic arm, and m is the number of the spatial dimensions of the track of the end of the robotic arm, and $\dot{\theta}$ and $\dot{r}$ are respectively the derivatives of the joint angle and the track of the end of the redundant robotic arm 10 with respect to time;

2) Designing or creating an inverse kinematics problem in step 1 as a time-varying convex quadratic programming problem constrained by an equality.

An exemplary formula is:

$$\min\left(\frac{x^T W x}{2} + c^T x\right)$$
$$\text{s.t.} \quad (J(\theta)x = b)$$

where $x=\dot{\theta}$, $b=\dot{r}$. $W=I$ represents an identity matrix, $J(\theta)$ is the Jacobian matrix 24 of the redundant robotic arm 10, and c is a performance indicator coefficient.

Figure 2A:
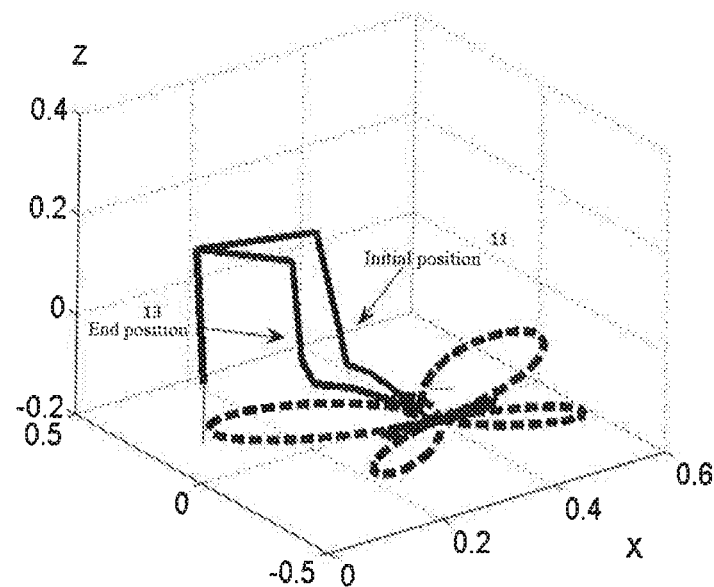
FIG. 2(a) is a schematic diagram showing the redundant robotic arm of the embodiment of the present disclosure performing a non-repeating motion.
Figure 2B:
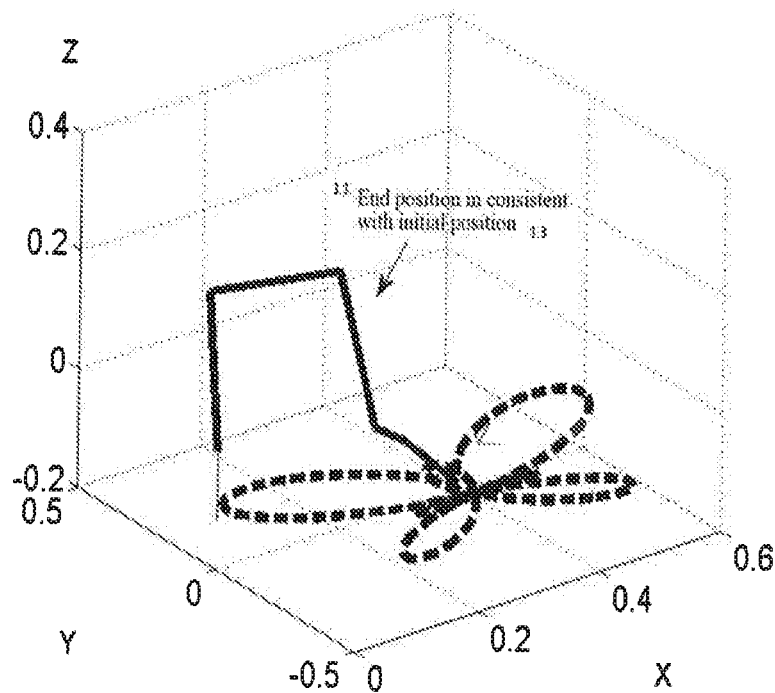
FIG. 2(b) is a schematic diagram showing the redundant robotic arm of the embodiment of the present disclosure performing a repeating motion.

3) Introducing a repeating motion indicator 26 into the time-varying convex quadratic programming problem of step 2. The repeating motion indicator in this step is obtainable by means of the performance indicator coefficient c, which is designed as $c=\zeta(\theta(t)-\theta(0))$, where $\zeta$ represents the response coefficient to a joint offset, and in this embodiment $\zeta=5$; and $\theta(t)$ and $\theta(0)$ respectively represent a joint state during c the movement of the robotic arm and an initial joint state. When the repeating motion indicator c is not considered, $\zeta=0$, the simulation result is as shown in FIG. 2(a). In this case, after the robotic arm 10 completes a cycle of motions, it is impossible to ensure that the end position 11 and the initial position 13 of each joint of the robotic arm 10 are consistent; and when the repeating motion indicator is considered, $\zeta=5$, the simulation result is as shown in FIG. 2(b), the end position 11 of each joint of the robotic arm 10 is consistent with the initial position 13 thereof. This arrangement is preferred.

4) Converting the time-varying convex quadratic programming problem, into which the repeating motion indicator is introduced in step 3, into a time-varying matrix equation 30 by using a Lagrangian function 28.

An example of a process of this step is that the Lagrangian function 28 is constructed as:

$$L(x, \lambda, t) = \frac{x^T W x}{2} + c^T x + \lambda(J(\theta)x - b)$$

where $\lambda$ is a Lagrangian multiplier, and the partial derivatives of the Lagrangian function 28 respectively with respect to x and $\lambda$ are obtained:

$$\frac{\partial L(x, \lambda, t)}{\partial x} = Wx + c + J^T(\theta)\lambda = 0$$

$$\frac{\partial L(x, \lambda, t)}{\partial \lambda} = J(\theta)x - b = 0$$

The above system of equations can be expressed as the following time-varying matrix equation 30:

$$Qy = u$$

$$\text{where } Q = \begin{bmatrix} W & J^T(\theta) \\ J(\theta) & 0 \end{bmatrix} \in E^{(n+m)\times(n+m)},$$

$$y = \begin{bmatrix} x \\ \lambda \end{bmatrix} \in R^{(n+m)}, u = \begin{bmatrix} -c \\ b \end{bmatrix} \in R^{(n+m)}.$$

5) Solving the time-varying matrix equation 30 of step 4 by means of the variable parameter convergence differential neural network 32; and the specific process of this step is that the error of the time-varying matrix equation converges to zero based on the variable parameter convergence differential neural network. Firstly, an error function is constructed as:

$$\varepsilon(t) = Qy - u$$

where $\varepsilon(t)$ represents the error of the time-varying matrix equation, and then based on a neurodynamic method, the error is designed to converge to zero in the following way, the specific formula is:

$$\frac{d\varepsilon(t)}{dt} = -\gamma \exp(t)\Phi(\varepsilon(t))$$

where $\gamma$ is a parameter for adjusting a convergence rate, $\Phi(\bullet)$ is an activation function, and the error function is substituted into the above formula to obtain a variable parameter convergence differential neural network solver 32, namely:

$$Q\dot{y} = -\dot{Q}y - \gamma \exp(t)\Phi(Qy - u) + \dot{u}$$

In this way, the variable parameter convergence differential neural network solver 32 obtains an optimal solution y* of the time-varying matrix equation, and the first n terms thereof are the optimal solution x* of the time-varying convex quadratic programming problem in step 2 i.e., the optimal solution of a joint angular velocity.

6) Integrating an optimal solution, obtained in step 5, of the redundant robotic arm 10 at the velocity level to obtain an optimal solution of a joint angle 34.

The optimal solution $\theta^*$ of the joint angle 34 in this step is obtained by integrating the optimal solution of the time-varying convex quadratic programming problem, i.e. the optimal solution x* of the joint angular velocity.

The specific process of this step is that by means of the variable parameter convergence differential neural network solver in step 5, the optimal solution y* can be obtained, and the first n terms thereof are the optimal solution x* of the time-varying convex quadratic programming problem in step 2 i.e., the optimal solution of a joint angular velocity, which can be integrated to obtain the optimal solution $\theta^*$ of the joint angle of the redundant robotic arm.

The foregoing description is merely illustrative of the disclosed embodiments of the present disclosure, but the scope of protection of the present disclosure is not limited thereto. Equivalent replacements or modifications made to the technical solutions and the inventive concept of the present disclosure by a person skilled in the art within the scope of the disclosure of the present disclosure fall into the scope of protection of the present disclosure.

The invention claimed is:

1. A method for performing a repeating motion of a robotic arm on the basis of a variable parameter convergence differential neural network, comprising:

providing a robotic arm, the robotic arm having an end and a plurality of joints;

providing a system for operating the robotic arm by the following steps:

a) establishing an inverse kinematics equation of the robotic arm at a velocity level by tracking the end of the robotic arm;

b) generating an inverse kinematics problem as a time-varying convex quadratic programming problem constrained by an equality;

c) obtaining an initial joint state $\theta(0)$ of the robotic arm and a joint state $\theta(t)$ during the motion of the robotic arm, and introducing a repeating motion indicator into the time-varying convex quadratic programming problem; wherein the repeating motion indicator is obtainable by means of the performance indicator coefficient c, which is designed as $c=\zeta(\theta(t)-\theta(0))$, where $\zeta$ represents the response coefficient to a joint offset;

d) converting the time-varying convex quadratic programming problem, into a time-varying matrix equation by using a Lagrangian function;

e) solving the time-varying matrix equation by the variable parameter convergence differential neural network; wherein the error of the time-varying matrix equation converges to zero based on the variable parameter convergence differential neural network, an error function is constructed as:

$$\varepsilon(t)=Qy-u$$

where $\varepsilon(t)$ represents the error of the time-varying matrix equation, and then based on a neurodynamic method, the error is designed to converge to zero in the following way:

$$\frac{d\varepsilon(t)}{dt}=-\gamma\exp(t)\Phi(\varepsilon(t))$$

where $\gamma$ is a parameter for adjusting a convergence rate, $\Phi(\cdot)$ is an activation function, and the error function is substituted into the above formula to obtain a variable parameter convergence differential neural network solver, namely:

$$Q\dot{y}=-\dot{Q}y-\gamma\exp(t)\Phi(Qy-u)+\dot{u}$$

where the variable parameter convergence differential neural network solver obtains an optimal solution y* of the time-varying matrix equation, and the first n terms thereof are an optimal solution x* of the time-varying convex quadratic programming problem, i.e., an optimal solution of a joint angular velocity;

f) integrating the optimal solution x* of the robotic arm at the velocity level to obtain an optimal solution $\theta^*$ of a joint angle; and g) using the optimal solution $\theta^*$ of the joint angle to operate the robotic arm to perform the repeating motion, so that after the end of the robotic arm completes a cycle of actions, all the joints of the robotic arm can return to an initial position.

2. The method for performing a repeating motion of a robotic arm on the basis of a variable parameter convergence differential neural network, as claimed in claim 1, wherein the inverse kinematics equation of the robotic arm is expressed as:

$$f(\theta)=r$$

where r is a desired track of an end of the robotic arm, and $f(\cdot)$ is a nonlinear equation of the joint angle of the robotic arm, and the inverse kinematics equation of the robotic arm at the velocity level is obtained by deriving the two sides of the equation with respect to time:

$$J(\theta)\dot{\theta}=\dot{r}$$

where $J(\theta)\in R^{m\times n}$ is an m×n-dimensional matrix on the real number field, $J(\theta)$ is a Jacobian matrix of the redundant robotic arm, n is the number of the degrees of freedom of the robotic arm, and m is the number of the spatial dimensions of the track of the end of the robotic arm, and $\dot{\theta}$ and $\dot{r}$ are respectively the derivatives of the joint angle and the track of the end of the redundant robotic arm with respect to time.

3. The method for performing a repeating motion of a robotic arm on the basis of a variable parameter convergence differential neural network, as claimed in claim 1, wherein the formula for creating the inverse kinematics problem as a time-varying convex quadratic programming problem constrained by an equality is:

$$\min\left(\frac{x^T W x}{2}+c^T x\right)$$

$$\text{s.t. } (J(\theta)x=b)$$

where $x=\dot{\theta}$, $b=\dot{r}$, W=I represents an identity matrix, $J(\theta)$ is the Jacobian matrix of the robotic arm, and c is a performance indicator coefficient.

4. The method for performing a repeating motion of a robotic arm on the basis of a variable parameter convergence differential neural network, as claimed in claim 1, wherein the Lagrangian function is constructed as:

$$L(x,\lambda,t)=\frac{x^T W x}{2}+c^T x+\lambda(J(\theta)x-b)$$

where $\lambda$ is a Lagrangian multiplier, and the partial derivatives of the Lagrangian function respectively with respect to x and $\lambda$ are obtained:

$$\frac{\partial L(x,\lambda,t)}{\partial x}=Wx+c+J^T(\theta)\lambda=0$$

$$\frac{\partial L(x,\lambda,t)}{\partial \lambda}=J(\theta)x-b=0$$

the above system of equations can be expressed as the following time-varying matrix equation:

$$Qy = u$$

where $Q = \begin{bmatrix} W & J^T(\theta) \\ J(\theta) & 0 \end{bmatrix} \in E^{(n+m) \times (n+m)}$, $$y = \begin{bmatrix} x \\ \lambda \end{bmatrix} \in R^{(n+m)}, u = \begin{bmatrix} -c \\ b \end{bmatrix} \in R^{(n+m)}.$$

* * * * *